United States Patent

[11] 3,615,425

| [72] | Inventor | Keith Aston<br>Cheam, England |
|---|---|---|
| [21] | Appl. No. | 777,828 |
| [22] | Filed | Nov. 21, 1968 |
| [45] | Patented | Oct. 26, 1971 |
| [73] | Assignee | The Pavelle Corporation<br>New York, N.Y. |
| [32] | Priority | Nov. 22, 1967 |
| [33] | | Great Britain |
| [31] | | 53224/67 |

[54] METHOD OF MAKING A COLOR PHOTOGRAPHIC PRINT FROM A COLOR TRANSPARENCY, OR THE LIKE
4 Claims, 2 Drawing Figs.

| [52] | U.S. Cl. | 96/23 |
|---|---|---|
| [51] | Int. Cl. | G03c 7/16 |
| [50] | Field of Search | 96/23 |

[56] References Cited
UNITED STATES PATENTS

| 2,566,277 | 8/1951 | Williams et al. | 93/23 |
|---|---|---|---|
| 3,186,841 | 6/1965 | Berger et al. | 96/23 |
| 3,293,033 | 12/1966 | Maddock et al. | 96/23 |

Primary Examiner—William D. Martin
Assistant Examiner—Edward J. Cabic
Attorney—Darby & Darby ABSTRACT: The present invention involves a system for balancing the colors used in making colored photographic prints where the speed of the printing material is substantially greater for one color than for another. According to the invention a portion of the beam for printing the most rapid color components is reduced by suitable masking or filtering and exposure of the beam of that color component is automatically terminated. The color components of the entire illuminating beam are mixed so that exposure is made from the single mixed beam.

PATENTED OCT 26 1971 3,615,425

INVENTOR.
KEITH ASTON
BY
Bartholomew A. Diggins
ATTORNEY

METHOD OF MAKING A COLOR PHOTOGRAPHIC PRINT FROM A COLOR TRANSPARENCY, OR THE LIKE

This invention relates to a method of photographic color printing and is of particular advantage where one of the color components of the printing material has a relatively high speed so that exposure of that component needs to be restrained relative to that of the other components if unmanageably short exposure times are to be avoided. Such a relatively high speed of one color component of photographic printing material commonly occurs in commercially available materials.

More particularly the present invention relates to a method of photographic color printing of the kind wherein exposure of all color components of the printing material initially takes place simultaneously, such exposure being controlled by photoelectric control means to be terminated automatically when a sufficient exposure as determined by said control means has taken place. Such a method, hereinafter termed a method "of the kind referred to," is well known in the art.

According to the invention there is provided a method of photographic color printing of the kind referred to wherein an exposing light beam is subtractively filtered so that only over a part of the cross-sectional area thereof is light transmitted of one color for which said printing material has a color component of relatively high speed, exposure with that one color being controlled by said control means and terminated by the introduction of a shutter into said part only of the light beam, exposure of the other color component being similarly controlled and terminated by the introduction of appropriate color filters.

It will be appreciated that by using only said part of the light beam for exposure of said one color component of relatively high speed, its speed relative to that of the other color components can be effectively reduced.

If desired an additive color filter may be interposed in said part of the exposing light beam so that only said one color is transmitted over said part of the beam. If however said part of the beam transmits all component colors, then the said color filters for terminating exposures with the colors other than said one color will necessarily be interposed over the entire cross-sectional area of the beam.

Since the beam is asymmetrically filtered it will, of course, be necessary to mix the filtered light prior to illumination of the negative or transparency. Such mixing of the filtered light can be accomplished in the conventional manner by passing the filtered light into a diffuser box having white matt internal top and side surfaces and a base surface formed by an opal diffuser, the light which diffuses through the opal diffuser serving for illuminating the negative or transparency.

The invention also provides a color head in or for a photographic apparatus for printing or enlarging by the method of this invention upon a printing material of one of the color components of which has a relatively high speed, including, a lamp housing for a source of white light for generating an exposing light beam, a subtractive color filter for insertion partially and preferably to an adjustable extent into the beam to filter the beam so that only over part of the cross-sectional area thereof is light transmitted of the one color for which said printing material has a color component of relatively high speed, a shutter for insertion into that part of the beam unfiltered by said subtractive color filters to terminate the exposure of the printing material to said one color, color filters for insertion into the beam for terminating the exposure of the other color components of the printing material, light mixing means for mixing the filtered beam prior to illumination of the negative or transparency to be printed, and photoelectric control means for automatically introducing into the exposing light beam the said shutter and the appropriate color filters to terminate the exposures of the color components of the printing material when a sufficient exposure has taken place.

Thus, for example, in one arrangement for printing upon a printing paper which has relatively high speed to blue light a yellow filter is inserted into the beam to a predetermined amount to adjust the ratio of unfiltered to filtered areas of the beam to reduce the intensity of the blue light in the exposing light beam. Cyan and magenta filters are provided for terminating the exposure of the printing material by red and green light respectively and initially these filters are out of the beam. The three exposures (i.e., to blue, red and green light) initially proceed simultaneously and are monitored by the photoelectric control means which operates to separately terminate the exposure of each color component of the printing material at the appropriate times. The blue exposure is terminated by bringing a shutter into the unfiltered part of the beam only while allowing the green and red light to continue to pass through the section of the beam filtered by the yellow filter assuming that the green and red exposures have not been terminated before the shutter is introduced. The green exposure is terminated by moving the magenta filter across the whole cross-sectional area of the beam, and the red exposure is terminated by moving the cyan filter across the whole cross-sectional area of the beam. Clearly the order in which the three exposures are terminated may vary depending upon the color balance in the negative or transparency being printed and if, in this example, the blue exposure terminated first it will be appreciated that introduction of the shutter into that part of the beam which is unfiltered by the yellow filter would reduce the intensity of the red and green exposing light as well as terminate the blue exposure.

Alternatively there may be provided an additive filter for insertion into said part of the exposing light beam which is unfiltered by the said subtractive filter for filtering that part of the beam so that only light of the one color for which said printing material has a color component of relatively high speed is transmitted through said part of the cross-sectional area of the beam.

Thus in a modification of the above example the part of the exposing light beam remaining unfiltered when the yellow filter is partially inserted into the beam is filtered with a blue filter. The blue exposure is again terminated by introduction of the shutter only over the blue filtered area of the beam, and the green and red exposures can be terminated respectively either by introducing subtractive magenta and cyan filters or additive red and green filters across the yellow filtered area of the beam.

Referring to the drawing.

Figure 1:
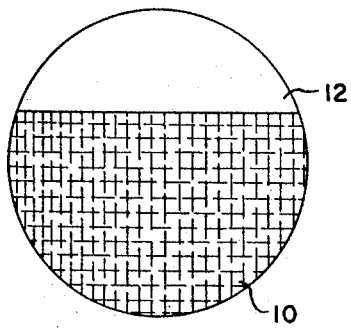
FIG. 1 is a diagrammatic cross section of the printing light beam according to one form of the invention.

In the modification shown in FIG. 1, the printing light beam which contains all of the colors, is circular in cross section and assuming that the sensitive material is predominantly sensitive to blue light, a yellow filter, indicated at 10, is inserted into the light beam. The filter 10 covers a portion of the beam to reduce the intensity of blue component of the light reaching the sensitive material to an amount more closely approximating the amount of red and green light for balanced exposure. When sufficient blue light has reached the sensitized material to provide proper exposure, the blue light exposure is cut off by a shutter which extends over only the portion 12 of the light beam which is not converted by the yellow filter. Cyan and magenta filters, not shown, are provided to control red and green exposure light on the sensitized surface and are interposed to cut off red and green light when the sensitive material is properly exposed in a balanced manner.

Figure 2:
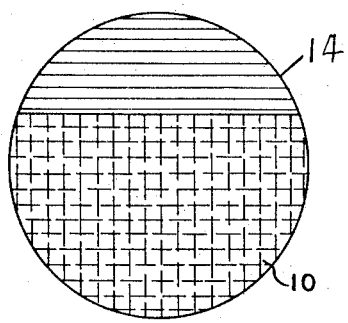
FIG. 2 is a diagrammatic view similar to FIG. 1 showing it modified form of the invention.

In the modification shown in FIG. 2, a blue filter 14 is provided in that portion of the beam not covered by the yellow filter.

It will be appreciated that the cross-sectional area of the exposing light beam need not be circular and can take any convenient shape. The amount of the exposing light beam filtered by the said subtractive filter is adjustable. Other parts of the apparatus may be conventional; the light source may include one or more lamps preferably of the type having an integral reflector, and the optical system may be conventional and include one or more lenses.

In a particularly convenient arrangement of the filters and the shutter it is arranged that the subtractive filter, when inserted partly into the beam, acts as a stop for the shutter which abuts against the subtractive filter when inserted.

The two parts of the exposing light beam, i.e., the part filtered by said subtractive filter and the part unfiltered by said subtractive filter, may if desired by separated by a mirror or prism system to facilitate differential treatment of the different parts of the beam.

If the light source includes a parallel arrangement of two or more lamps side by side it may be convenient to provide separate filter systems for each lamp and mix the separately filtered beams from each lamp in a common diffuser box. The photoelectric control means would control simultaneously all of the filter systems in such an arrangement.

I claim:

1. A method of making colored photographic prints from a photographic color transparency or the like on a photosensitive material sensitive to three primary colors and having high sensitivity to one color as compared to the other colors which comprise providing a beam containing the primary colors which is mixed and directed through the photographic color transparency onto said photosensitive material, filtering out light of said one color from a predetermined limited cross-sectional area of the beam with a subtractive color filter before the beam is mixed, while permitting light of said one color to pass in the remaining portion of said beam, thereby reducing the amount of light of such one color in the exposure beam, interposing a shutter only in the path of said remaining portion when the material is properly exposed for said one color, and cutting off said beam when the material is properly exposed to the other primary colors.

2. The method defined in claim 1 in which white light is permitted to pass in said remaining portion, and wherein said step of cutting off comprises inserting additional filters into the entire beam capable of cutting off exposure of each of the other colors when the sensitive material has received an amount of light of each color to provide an exposure of predetermined balance.

3. A method as defined in claim 1 in which an additional filter corresponding to said one color is inserted into said remaining portion of the beam so that only light of said one color passes in said remaining portion.

4. A method as defined in claim 3, wherein said step of cutting off comprises inserting additional subtractive filters only into the portion of said beam from which light of said one color has been filtered.

* * * * *